Dec. 15, 1942.   W. J. PHANEUF   2,305,028
RIFLING BROACH
Filed Feb. 8, 1941
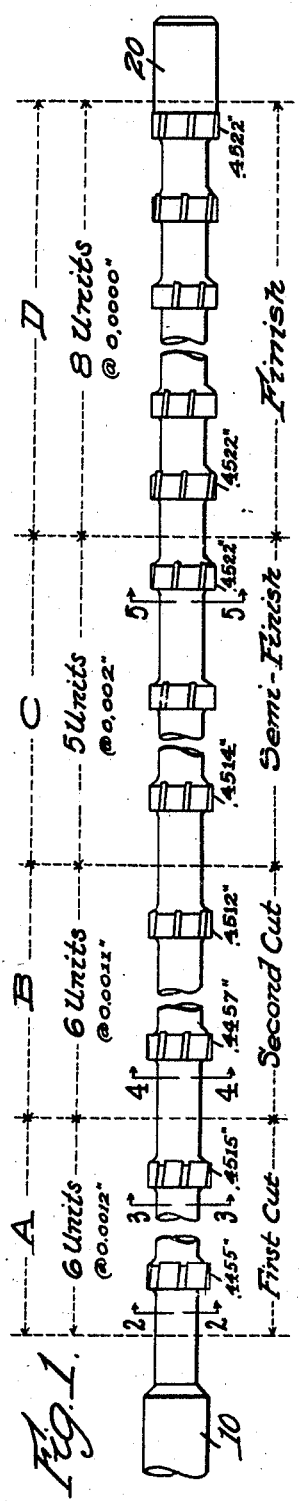
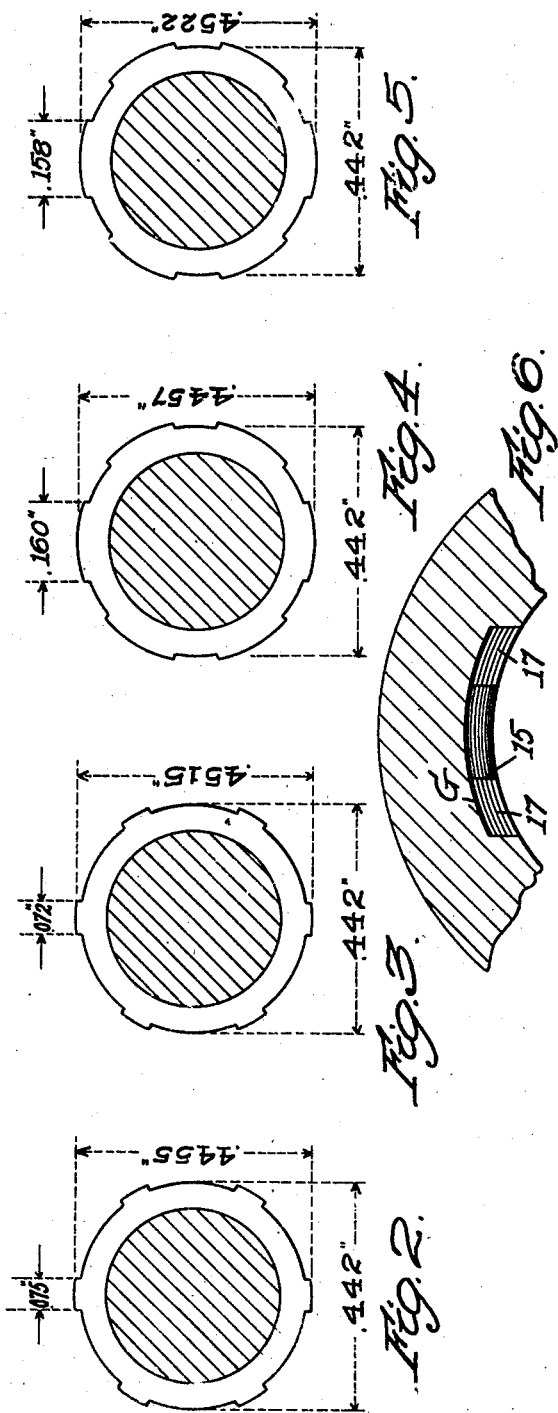
Inventor
Welrose J. Phaneuf.

Patented Dec. 15, 1942

2,305,028

UNITED STATES PATENT OFFICE 2,305,028

RIFLING BROACH

Wilrose J. Phaneuf, Hudson, Mass., assignor to The Lapointe Machine Tool Company, Hudson, Mass., a corporation of Maine Application February 8, 1941, Serial No. 378,043

2 Claims. (Cl. 90—28.1)

This invention relates to rifling the barrels of firearms. The grooves provided for this purpose are of relatively slight depth but are also relatively wide. They must be uniform in lead or twist and in diameter and they must be very smoothly finished.

It has been customary to produce such grooves by making many successive passes of a single tooth cutter through a barrel which is being simultaneously turned to provide a desired lead or twist.

It is the general object of my invention to provide a broach by which firearm barrels may be completely rifled by a single pass of the broach through the barrel.

A further object is to provide a broach with teeth so designed and related that the broach will produce its own uniform lead or twist in a barrel mounted for free rotation, thus avoiding the necessity of means for positively rotating the barrel as in the previous practice.

My invention further relates to arrangements and combinations of parts which will be hereinafter described and more particularly pointed out in the appended claims.

A preferred form of the invention is shown in the drawing, in which

Fig. 1 is a side elevation of my improved broach, with parts broken away;

Figs. 2, 3, 4 and 5 are transverse sections, taken along the lines 2—2, 3—3, 4—4 and 5—5 respectively in Fig. 1; and Fig. 6 is an enlarged partial sectional view of a portion of a firearm barrel, and illustrates successive steps in the removal of stock by my improved broach.

Referring to Fig. 1, my improved rifling broach is a substantially elongated tool comprising four successive series of broaching units A, B, C and D, each provided with a plurality of broaching teeth. Throughout the length of the broach, the teeth are disposed in helical lines, corresponding to the desired lead or twist of the grooves.

The teeth of the first or A series of broaching units produce a plurality of narrow helical grooves which are of substantially full depth but only of about one-half width. The teeth of the second or B series of broaching units remove additional stock at each side of the grooves formed by the teeth of the first series and produce rifling grooves which are of full width and very nearly of full depth. The teeth of the third or C series of broaching units slightly increase the depth of the grooves, and the teeth of the fourth and last or D series of broaching units accurately size and smooth the grooves to the desired final section and finish.

Describing the broach more specifically, the usual shank 10 is provided by which the broach may be pulled through the work. The diameter of this shank and also the diameter of each broaching unit between the cutting teeth corresponds closely to the internal diameter of the barrel to be broached, so that the broach will be maintained at all times accurately concentric with the bore.

In the illustrative drawing, it is assumed that the finished rifle grooves are to be approximately 0.158" in width and approximately 0.452" in diameter to the bottoms of opposite grooves.

The teeth in the first or A series of units are approximately one-half the width of the desired finished grooves. The teeth in the first unit (Fig. 2) in the A series are shown as 0.075" wide, and the teeth in the last unit (Fig. 3) in the A series are 0.072", the width of tooth being preferably slightly reduced from unit to unit to avoid side friction. The outside diameter of the teeth in the first or A series of units increases progressively by steps of 0.0012" from 0.4455" in Fig. 2 to 0.4515" in Fig. 3.

Each tooth thus removes sufficient depth of stock to make a clear cut and the teeth in the first unit (Fig. 2) make initial cuts of sufficient depth to establish the twist or lead and to automatically turn the work, if the work is supported in a rotatable work holder having anti-friction bearings.

The teeth in the first or A series of units (Figs. 2 and 3) remove successive layers of stock as indicated in Fig. 6 and finally produce narrow grooves 15 of substantially full depth.

The teeth in the second or B series of units (Fig. 4) operate in a similar manner to remove layers of stock in the portions 17 (Fig. 6) at each side of the initial narrow grooves 15. These teeth also preferably decrease slightly in width to avoid side friction but increase substantially in outside diameter from unit to unit, the amount of this increase in the illustrated broach being 0.0011" per unit and the diameter increasing from 0.4457" in the first unit (Fig. 4) to 0.4512" for the last B unit.

The two groove portions 17 are approximately equal in width to the single groove 15, so that the load is substantially the same for both cuts.

The first and second or A and B series of units thus produce a plurality of grooves G of the desired lead or twist and of approximately full width but slightly under full depth.

The teeth in the third or C series of units (Fig. 5) perform a semi-finish operation and are slightly stepped-in from unit to unit, with an illustrated increase in diameter for each unit of 0.0002".

The units of the finish or D series are preferably all identical and are substantially the same as the last stepped-in unit (Fig. 5). They act to size, smooth and polish the grooves already cut by the preceding teeth.

The follower 20 at the end of the broach is of the same diameter as the shank 10 and also the same as the diameter of the broaching units between the cutting teeth, so that the broach is concentrically guided until fully removed from the work.

It should be noted that sufficient teeth are always positioned in the grooves to accurately maintain the lead, as successive teeth enter the work. Each tooth is slightly undercut on its advance edge and slightly backed off on its outer surface, in accordance with usual practice.

A broach thus designed and constructed has been found capable of producing accurate and satisfactory grooving in a firearm barrel by a single pass through the work. By so doing, my improved broach effects a very great reduction in the time consumed in the rifling operation, as compared with the previous practice.

Having thus described my invention and the advantages thereof, I do not wish to be limited to the details herein disclosed, otherwise than as set forth in the claims, but what I claim is:

1. A rifling broach comprising a first series of broaching units having teeth each substantially one-half the width of a finished groove and increasing progressively and by substantial increments in outside diameter to slightly less than full depth of groove, a second series of broaching units having teeth each substantially the full width of a finished groove and increasing progressively by substantial increments in outside diameter to slightly less than full depth of groove, a third series of broaching units having stepped-in teeth of substantially full width and increasing progressively in outside diameter but by relatively small increments to full depth of groove, and a fourth series of substantially identical broaching units having finish teeth of substantially full width and of full outside diameter, and the teeth in all of said successive units being angularly related to effect a predetermined lead and each cutting tooth in the first and second series removing substantially equal increments of stock.

2. A rifling broach comprising a first series of broaching units having teeth each substantially one-half the width of a finished groove but with successive teeth progressively and very slightly reduced in width and increasing progressively and by substantial increments in outside diameter to slightly less than full depth of groove, a second series of broaching units having teeth each substantially the full width of a finished groove but with successive teeth progressively and very slightly reduced in width and increasing progressively by substantial increments in outside diameter to slightly less than full depth of groove, a third series of broaching units having stepped-in teeth of substantially full width and increasing progressively in outside diameter but by relatively small increments to full depth of groove, and a fourth series of substantially identical broaching units having finish teeth of substantially full width and of full outside diameter, and the teeth in all of said successive units being angularly related to effect a predetermined lead and each cutting tooth in the first and second series removing substantially equal increments of stock.

WILROSE J. PHANEUF.